US011836332B1

(12) United States Patent
Wiegele et al.

(10) Patent No.: US 11,836,332 B1
(45) Date of Patent: Dec. 5, 2023

(54) REPRESENTATION OF REMOTE ASSETS SYSTEM AND METHOD

(71) Applicants: Edward J. Wiegele, Tulsa, OK (US); John A. Utley, Tulsa, OK (US); John L. Beets, Tulsa, OK (US); Peter G. Veenstra, Tulsa, OK (US); Lucas M. Hutmacher, Tulsa, OK (US)

(72) Inventors: Edward J. Wiegele, Tulsa, OK (US); John A. Utley, Tulsa, OK (US); John L. Beets, Tulsa, OK (US); Peter G. Veenstra, Tulsa, OK (US); Lucas M. Hutmacher, Tulsa, OK (US)

( * ) Notice: Subject to any disclaimer, the term of this patent is extended or adjusted under 35 U.S.C. 154(b) by 126 days.

(21) Appl. No.: 17/228,882

(22) Filed: Apr. 13, 2021

Related U.S. Application Data

(63) Continuation of application No. 16/397,588, filed on Apr. 29, 2019, now abandoned, which is a continuation of application No. 15/090,728, filed on Apr. 5, 2016, now abandoned, which is a continuation of application No. 13/853,377, filed on Mar. 29, 2013, now abandoned.

(60) Provisional application No. 61/686,041, filed on Mar. 29, 2012.

(51) Int. Cl.
*G06F 3/0484* (2022.01)
*G06F 3/14* (2006.01)
*G06F 3/0481* (2022.01)

(52) U.S. Cl.
CPC .......... *G06F 3/0484* (2013.01); *G06F 3/0481* (2013.01); *G06F 3/14* (2013.01)

(58) Field of Classification Search
CPC .......... G06F 3/0484; G06F 3/0481; G06F 3/14
See application file for complete search history.

(56) References Cited

U.S. PATENT DOCUMENTS

| 5,848,373 A | * | 12/1998 | DeLorme | G01C 21/3667 |
| | | | | 340/995.26 |
| 8,245,157 B2 | | 8/2012 | Kelly | |
| 8,255,816 B2 | | 8/2012 | Hammock et al. | |
| 2001/0029989 A1 | * | 10/2001 | Paz | G01V 15/00 |
| | | | | 138/104 |
| 2002/0196008 A1 | | 12/2002 | Hilleary | |

(Continued)

FOREIGN PATENT DOCUMENTS

CN    101630419 A  *  1/2010

OTHER PUBLICATIONS

CN-101630419-A (English Translation) (Year: 2010).*

(Continued)

*Primary Examiner* — William L Bashore
*Assistant Examiner* — Gregory A Distefano
(74) *Attorney, Agent, or Firm* — Phillips Murrah PC; Martin G. Ozinga

(57) ABSTRACT

The present invention is a system and method of creating a pictorial depiction of a desired location wherein assets, such as but not limited to pipeline systems, may be located wherein a series of images is utilized to create a depiction such that when viewed remotely the person viewing the images is generally given the image and related desired information about the image and wherein the now created virtual representation may be accessible as desired and embedded with further information for retrieval as desired.

1 Claim, 2 Drawing Sheets

(56) References Cited

U.S. PATENT DOCUMENTS

| | | | |
|---|---|---|---|
| 2003/0198374 A1* | 10/2003 | Hagene | G01N 21/954 |
| | | | 382/141 |
| 2004/0031337 A1* | 2/2004 | Masaniello | G01N 29/4445 |
| | | | 73/865.8 |
| 2004/0249491 A1 | 12/2004 | Hott | |
| 2005/0040224 A1* | 2/2005 | Brinton | G06Q 10/06 |
| | | | 235/376 |
| 2005/0246112 A1 | 11/2005 | Abhulimen et al. | |
| 2007/0083398 A1* | 4/2007 | Ivey | G06Q 50/04 |
| | | | 705/4 |
| 2007/0177982 A1 | 8/2007 | Cadet et al. | |
| 2008/0082215 A1 | 4/2008 | McDowell | |
| 2011/0009984 A1 | 1/2011 | Mukhi et al. | |
| 2011/0029102 A1* | 2/2011 | Campney | G05B 17/02 |
| | | | 700/83 |
| 2011/0066297 A1* | 3/2011 | Saberi | H04Q 9/00 |
| | | | 700/287 |
| 2012/0029661 A1* | 2/2012 | Jones | G06F 3/0484 |
| | | | 700/17 |
| 2012/0065944 A1 | 3/2012 | Nielsen et al. | |
| 2012/0206595 A1* | 8/2012 | Alphenaar | G06Q 10/0631 |
| | | | 702/45 |

OTHER PUBLICATIONS

Hausamann D., Zirnig W. and Schreler G., Monitoring of gas transmission pipelines—A customer driven civil UAV application ODAS Conf.

Allen, M., Preis, A., Iqbal, M., Sriangarajan, S., Lim, H.B., Girod, L., Whittle, A.J. (2011) Real-time in-network distribution system monitoring to improve operational efficiency. Journal American Water Works Association (AWWA), 103(7), 63-75.

\* cited by examiner

REPRESENTATION OF REMOTE ASSETS SYSTEM AND METHOD

CROSS-REFERENCE TO RELATED APPLICATIONS

This application is a continuation of U.S. patent application Ser. No. 16/397,588, filed on Apr. 29, 2019, which is a continuation of U.S. patent application Ser. No. 15/090,728, filed Apr. 5, 2016, now abandoned, which is a continuation of U.S. patent application Ser. No. 13/853,377 filed on Mar. 29, 2013, now abandoned, in which priority is claimed from provisional application U.S. Ser. No. 61/686,041 filed on Mar. 29, 2012 and incorporated by reference herein.

BACKGROUND OF THE INVENTION

1. Field of the Invention

The present invention relates generally to a novel application of visually depicting and accessing information related to field assets such as but not limited to pipelines and pipeline systems. More particularly, the present invention utilizes novel software based solutions to enable users to utilize an image as well as attributes of a remote asset like a pipeline for enhanced communications between various personnel and or agencies affiliated with pipeline systems wherein the attributes and associated information may be a picture, map, image, report, chart or otherwise desirable information and or depiction related to same.

2. Description of the Prior Art

Pipelines for such things as oil and gas literally span the entire North American continent. These pipelines provide essential means for transporting everything from natural gas to water. Failures associated with such systems can be as dramatic as loss of life and horrific environment disasters as well as lead to tarnished corporate images and loss of revenue. Obviously, improper maintenance and failures with these systems can lead to unwanted increased administration by government agencies as well as increased regulations and fines.

In the field of monitoring and managing field assets such as pipelines in particular, conventional approaches are limited in their ability to truly capture the makeup of field assets in a way that can be effectively used for communication, visualization, and operational use. Frequently, field operations of field assets typically require personnel to travel to off-site field locations to visually inspect the field assets for maintenance, inspection, and upgrades. Additionally, the documentation maintained for the visual assets is often lacking and does not offer the organization and reference ability necessary for effective and safe use and analysis. Because field assets are often located over a broad geographic area, dispatching personnel to inspect the field assets or otherwise retrieve necessary information can be costly and time consuming.

The current methods of depicting field assets and communications regarding the same are insufficient to manage large amounts of information on complex sites and projects. Further, the current methods are inadequate to communicate to associated personnel and agencies working with pipelines and pipeline systems and inadequate to facilitate discussions between those in the field with others who are not. Therefore, a need and a desire exist to provide a means for retrieving and utilizing specific attributes of field assets such as pipeline and pipeline systems in a workable and efficient manner. The current invention may provide an easily and readily available pipeline data from many angles such as but not limited to a map view, report view, and a chart view that may allow users to interact and toggle between these views in an unconstrained manner and to be performed on an ad-hoc basic where the prior art fails.

SUMMARY OF THE INVENTION

In view of the foregoing disadvantages and limitations inherent in the known types of visual depiction systems and methods now present in the prior art, the present invention provides a new and improved system and method wherein the same can be utilized in those situations where high detail clarification, ease of use, and low cost are desired. As such, the general purpose of the present invention, which will be described subsequently in greater detail, is to provide a new and improved visual representation of remote assets, such as but not limited to pipelines, system and method which allows depiction and communications associated therewith which has all the advantages of the prior art systems and methods and none of the disadvantages.

The current invention may generally provide a cloud computing environment that is comprised of a set of applications that allows a user such as an owner company and supporting vendors to view linear referenced pipeline data in both map and/or chart/table view driven by spatial location and/or relative location and/or pipeline hierarchy. Using the cloud computing based technology, supporting vendors can have easy access to deliver data seamlessly to the user cloud environment. Further subsequent data edits to the cloud computing environment can seamlessly be integrated back to the owner company corporate systems. This methodology may provide the user a scalable, flexible, and real-time access to specific data from anywhere in the world.

To attain this, the present invention essentially comprises a method of creating a pictorial depiction of a desired location wherein assets may be located such as but not limited to a pipeline, pipeline system, and associated ancillary systems. The pictorial depiction may be created by a series of photographs, images and or videos from one or more positions such that the assets to be remotely accessed are virtually represented. The now created virtual representation may be accessible as desired and embedded with further information and features such as but not limited to pipeline name, segment, pipe diameter, wall thickness, inspection reports, operator, owner, and so forth further described below. It is contemplated that the information may be retrieved by a user utilizing a hand help computing device, smart phone, laptop, interne in general, phone service in general, tablets, desktops, combinations thereof and so forth.

The invention also contemplates an integrity and infrastructure reliability cloud (IIRC) that would enable pipeline operators to manage their spatial data in a fast, easy to use and easy to learn fashion while lowering their data management costs per pipeline mile. The invention may utilize GOOGLE'S CLOUD COMPUTING ENVIRONMENT such that if a user can access and use GOOGLE MAPS, the user could utilize the current invention. This may illuminate any specified hardware and allow users to use existing devices as previously described.

Still furthermore, the invention may provide flexible and powerful search capabilities; pipeline attribute search; location search; zoom and pan functionality; use GOOGLE MAPS; allow the ability to review/update, in real time, pipeline attribute information; allow the user to identify pipeline features, view, and edit attributes describing the pipeline feature; identify a value wherein if the valve serial number is incorrect or missing the user can add it; be platform independent; provide for the integration of High Resolution/High Accuracy/Ortho-Rectified Imagery; allow basic reporting and printing of pipeline features and map; and print current screen view and the attribute table of the selected pipeline feature.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in this application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception upon which this disclosure is based may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Therefore, it is an object of the present invention to provide a new and improved application of visual technology for use in depicting, visualizing, and retrieving information associated with field assets such as but not limited to pipelines for enhanced communications and information retrieval between and by various personnel working with field assets.

It is a further object of the present invention to provide a new and improved application for information and image retrieval for pipelines that allows a user to access such information easily and quickly on various personal computing devices as well as and including phones and may also utilize cloud storage.

An even further object of the present invention is to provide a new and improved application for information and image retrieval for pipelines which is susceptible to a low cost of use with regard to both access and implementation, and which accordingly is then susceptible to low prices of use and sale to the consuming industry, thereby making such economically available to the consuming industry.

Still another object of the present invention is to provide a new and improved application for information and image retrieval for pipelines which provides all of the advantages of the prior art, while simultaneously overcoming some of the disadvantages normally associated therewith and especially those associated with complex assets and pipeline systems.

Another further object of the present invention is to provide a new and improved application for information and image retrieval for pipelines that may be easily and efficiently accessed, implemented, and utilized and, thus, facilitates multidisciplinary collaboration for communications, teaching, and or working on a project.

Yet another object of the present invention is to provide a new and improved application for information and image retrieval for pipelines that provide a clear and understandable method of referencing visual asset components and sub-components, the ability to visualize discrete details of the various components and sub-components of the visual assets, illustrate informational text and descriptions of various components, sub-components, and field assets, and also provide a method of data capture which is time and date stamped, of various information provided.

It is a further object of the present invention to provide a coordinated reference for various personnel to use for common reference and communication, provide an educational tool for visual asset personnel, provide for quick and easy reference of information about visual assets and provide visual orientation of assets as they relate to other assets and ancillary information regarding the same.

These, together with other objects of the invention, along with the various features of novelty, which characterize the invention, are pointed out with particularity in the claims annexed to and forming a part of this disclosure. For a better understanding of the invention, its operating advantages, and the specific objects attained by its uses, reference should be had to the accompanying drawings and descriptive matter in which there are illustrated preferred embodiments of the invention.

BRIEF DESCRIPTION OF THE PICTORIAL ILLUSTRATIONS, GRAPHS, DRAWINGS, AND APPENDICES

The invention will be better understood and objects other than those set forth above will become apparent when consideration is given to the following detailed description thereof. Such description makes reference to the annexed pictorial illustrations, graphs, drawings, and appendices.

DETAILED DESCRIPTION OF THE PREFERRED EMBODIMENTS

In a preferred embodiment, the invention may be a system, method, process, method of doing business, and or a computer program with the understanding it may also be combinations of the same. It is understood that the following is for purposes of illustration and should not be considered to limit the scope of the invention. It is understood that the current invention may be utilized for numerous applications other than specific pipeline and pipeline systems. It may be utilized with other applications where it is desirable to have a depiction of items, assets, buildings, lots, inventories and so forth. Furthermore, the term "virtual" and or "remote assets" should not be considered limiting the scope of the invention.

In the field of the utility industry for instance, it is well understood that consistent maintenance and visual inspection of various types of field assets is required. For a given utility type of company or operation, a large number of field assets may encompass a large geographic area. Visual inspection of these various field assets may require substantial time to get to them, which is not cost effective. Having the ability to visually inspect field assets from a remote location, assessing them for planning purposes, and have mirrored reference in a control room to someone in the field inspecting a field asset are critical to ensure efficiency and safety.

It is contemplated that the application of using the present invention in the fields of the utility industry, refineries, power production facilities, operations of equipment or resources, and other related fields with geographically dispersed field assets is advantageous for safety and cost effectiveness. It is further contemplated that the geographic dispersion of field assets may be over large land areas, or over small land areas, such as may be the case in an oil refinery plant. It is also contemplated to provide smaller items, such as the interior of a pipeline. There are a number of industries with varied types of field assets, all of which may be applicable to benefit from the present invention. The terms visual asset, field assets, and various industries mentioned should not be considered limiting and are used for general reference only.

Figure 1:
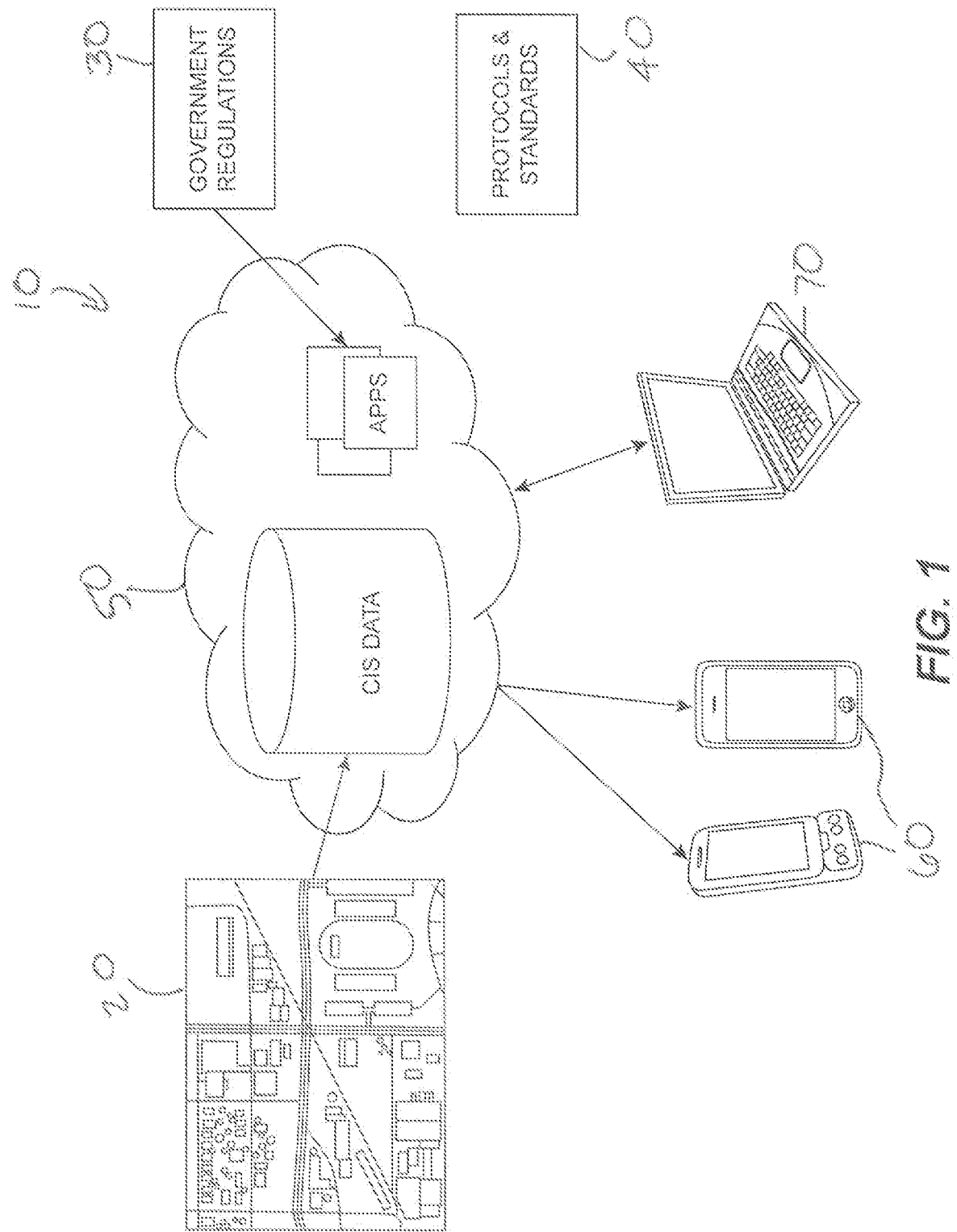
FIG. 1 is generally an illustration of an overall system of a preferred embodiment of the present invention.
Figure 2:
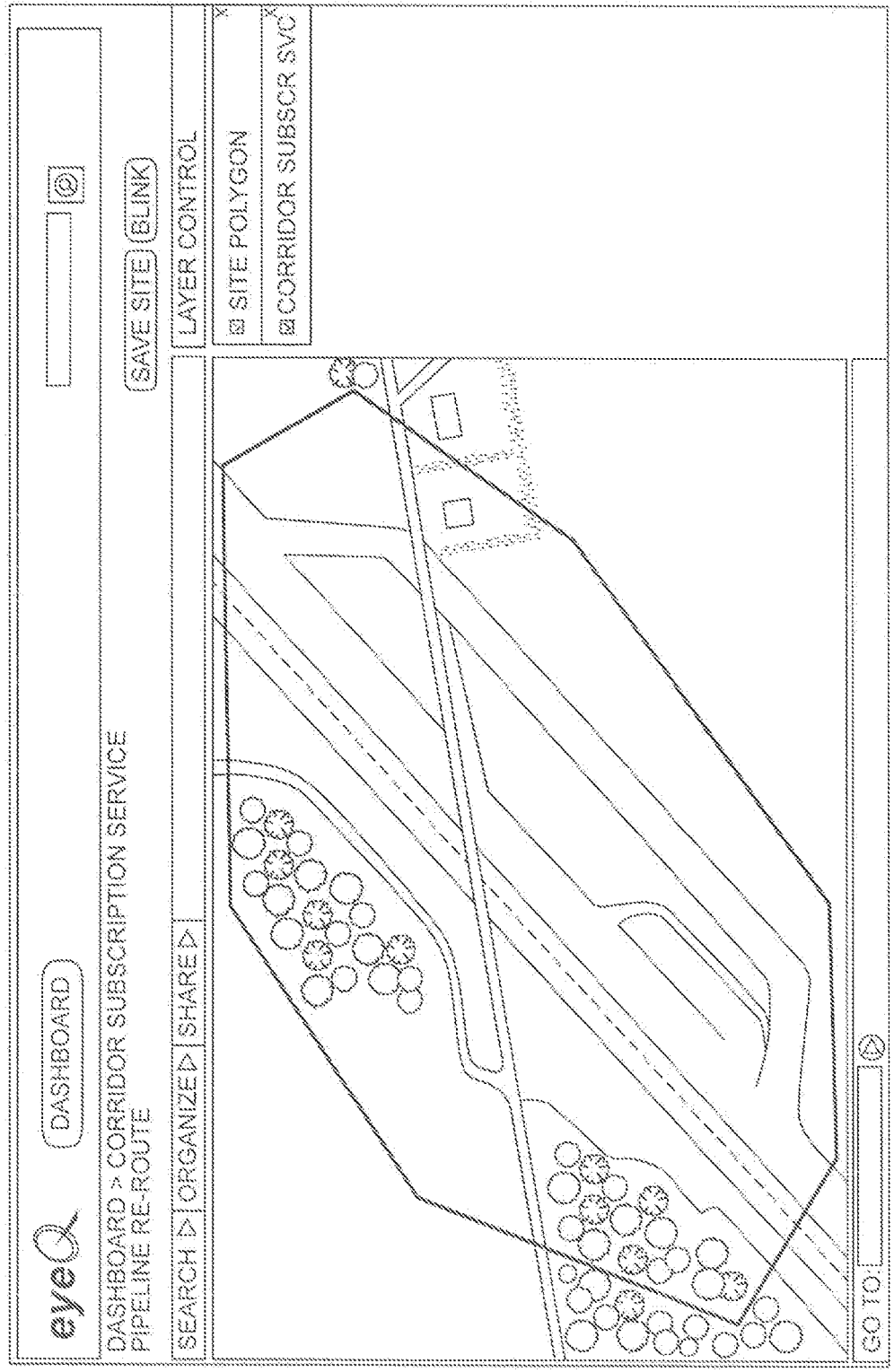
FIG. 2 is generally an illustration of a preferred embodiment in accordance with a preferred construction of the present invention depicting a screen capture and or dashboard.

FIG. 1 generally illustrates a preferred embodiment of the invention. Referring to the illustration in more detail, reference character 10 generally designates a new and improved representation of remote assets system and method in accordance with the present invention. In such field assets, the field asset itself may be large, with numerous sub-components. In the case of pipelines and pipeline systems, the field asset may encompass a relatively large land area as shown in image 20, up to several acres, have a number of parts, components, lines, and other such sub-components. Image 20 and other information such as but not limited to government regulations 30, protocols and standards 40 may be uploaded to a computer system 50. Computer system 50 may be a cloud storage configuration, but is not limited to such, and may have numerous applications referred to as "apps". Computer system 50 may be accessible by hand held devices 60 such as "smart phones" and computers 70 in general. It is understood that information may be uploaded from hand held devices 60 and or computer 70 to computer system 50.

Furthermore, it is contemplated that some information that may be deemed confidential may be accessible by a private cloud system for use by operators, regulators, and so forth. Protocols and standards 40 may be for loading and validating data to common platforms. Government regulations 30 may include applications reflecting the latest regulations for data upload, maintenance, display, and analysis. Image 20 may also generally be an accurate imagery stored and maintained in a cloud storage system and may be updated annually.

It should be understood that many other methods of implementation may be used as well, including all those, which are known in the art of computers, information sharing, and the like. Such information may be emailed, uploaded, downloaded, and maintained on a server, computer, or other.

The user may additionally capture an area of an image or scene by the coordinates tool, or other such means, and send such image segment of that photo or other to another personnel within the system and then through tracking means, track those views and other communications, which may be logged for later reference.

Zoom features as well as general movement about any images or scenes may be controlled by any number of means used in conventional computer industry, including but not limited to touch pad, mouse, on-screen icons, touch screen control, or other such methods.

The information viewed in the preferred embodiment may be pre-recorded or pre-digitized photography or videography, or may be live streaming, or delayed streaming video or photography. The use of streaming video or photography requires numerous camera based systems to reside on the properties at the location of the various field assets. This may be beneficial for use in security monitoring; it provides little value to operations, as the state of such field assets is relatively unchanged over long periods of time. Such systems are typically static in nature, and even when a sub-component may require maintenance, the visual aspects of it are typically unchanged. Using real-time or streaming video or photos may be valuable for security, but is likely not a cost effective solution for broad use of numerous visual assets. The use of the terms streaming or live, or real-time should not be considered limiting, and are used for illustrative purposes in order to allow those skilled in the art to comprehend such embodiment. This type of view may additionally allow for operations in the control room to monitor the personnel at the site of the field asset. In such a case, added value beyond security is obtained. The state of security of field assets, and grid technology in general, is very important, and adding such monitoring equipment may be a valuable component. There is additionally an added cost of transmitting the information from such camera, or the like, based systems to the central control room. Security of such data transmission may be costly.

Further, in current practices, a number of other monitoring systems are available for the state of the various components and subcomponents of such a field asset. It is understood that SCADA generally stands for "supervisory control and data acquisition". It generally refers to industrial control systems, also known as an "ICS", computer systems that monitor and control industrial, infrastructure, or facility-based processes. Examples are industrial processes that include those of manufacturing, production, power generation, fabrication, and refining, and may run in continuous, batch, repetitive, or discrete modes. Infrastructure processes that may be public or private, and include water treatment and distribution, wastewater collection and treatment, oil and gas pipelines, electrical power transmission and distribution, wind farms, civil defense siren systems, and large communication systems. Facility processes that occur both in public facilities and private ones, including buildings, airports, ships, and space stations. They monitor and control HVAC, access, and energy consumption, played to the control room for monitoring.

In a preferred embodiment, the use of pre-recorded photography or videography may provide a more cost effective solution. Again, since the visual state of such field asset systems have few if any moving parts, data from them is already sent via SCADA and other monitoring systems, and existing surveillance systems may be used to determine if someone has entered the premises illegally, pre-recorded still photography and the like is a preferred method. As the field asset may change, such as with expansion of the field asset or changes to components, new photography may be taken, stitched into the full virtual tour picture of the scene or visual assets of the field asset, and kept updated accordingly. All photography or videography collected may be date stamped to allow those monitoring such equipment to have a reference of the accuracy of such information.

In a preferred embodiment, additional features may include the ability to measure distances between items within the visual images of the field asset. This measurement means may be accomplished electronically, by reference, or other such methods as those skilled in the art may utilize. Doing so may enable for personnel viewing such images to gain additional perspective of size, location, and general orientation of field asset components, subcomponents, and relationship amongst them. In one embodiment, this may be accomplished by selecting distinct points on the image, and allowing the program to autonomously determine the relationship between them. Further grid layout of the environment may be used in X, Y, and/or Z planes to help assess general orientation and layout between the various aspects of the visual asset. It is also contemplated to provide visual cues in the pictorial sphere such as but not limited to general direction of view as in North, South, East and West.

Informational text may be applied to any scene or image to enable for information to be displayed such as but not limited to specific changes to the hardware or components of the field asset since the image was captured. This further helps promote comprehensive record keeping and documentation of the field asset.

In a preferred embodiment, the disclosed invention may include the ability to interface with various database systems including but not limited to Oracle, MySQL, PostgreSQL, and Microsoft SQL, or others that may be used in other existing utility applications.

Permission may be granted to various users to have access to any number or range of information contained within a complete packet. In such a case as with field assets for the utility industry, by way of example, certain operations departments may have access to certain sets of substations, but not others, and therefore may have access to view the files within a select group of field assets, whereas other operations personnel may have access to a larger set of field assets views. A search feature may allow the user to search through any number of images or scenes within various sets of virtual tours to find particular content. This may be used not only in information finding, but also in commerce applications. Various users may be added, deleted, or modified at any time, as well as any information contained within such images or virtual tours may be added, modified, or changed at any time.

In a preferred embodiment, a photographer may capture any number of images, any of which may include GPS coordinate locations correlated to the photography itself. The photographer may upload the images via the Internet, or physically upload by wired connection to a computer. Software may then automatically take the various images, stitch them together in an organized fashion. These virtual tours may compile together in various scene selections. As such, the set of virtual tours for a utility substation, by way of example, may utilize auto-build software, greatly simplifying the process of creating virtual tour packages. This is advantageous because there may be a large number of field assets whose images need to be captured, thus reducing cost, complexity, and chance of error of mixing up various files.

It is contemplated that any such scene or images may be integrated with SCADA or other such data monitoring or documentation. In such a case, one may view any given image, or segment of an image, and associated information on such instrument, component, electronics information, or other such data may be displayed within the virtual tour or image described in this disclosure. In such a case, such information about various aspects of the field asset may be linked directly into and with the visual asset. Information on part numbers, data from equipment, monitoring information, SCADA information, and other such pertinent information regarding the status, makeup, or monitoring of various field assets may be viewed through such system. Any such information may be live streaming information displayed in the scene or image, or may be tagged to selected aspects of the scene or image and not dynamically change. Any such information may be displayed in real-time or non-real time. None-the-less, any such information displayed may be modified and altered as needed.

Still further, any such information may be viewed additionally through other monitoring or visualizing devices, which may be placed near the actual equipment at a field asset, and which data may then be illustrated on such device. This monitoring or visualizing device may as well display the virtual tour or other such image of the actual scene on the device, which may be linked to GPS, or other geo-coding for determining its location. Such method may display SCADA, smart grid, maintenance, or accounting, or similar data on the actual display panel by pointing the display device at the panel, with visual reference to the device. This may further be accomplished by using a live feed video or similar technology that is relayed back to external location, in order to see the actual area from a remote location, place cross hairs over an item, and see such SCADA information, or other such information as may be relevant to the use of the field asset.

In a preferred embodiment, the scene or image may be a preferred location for a field asset on-site or off-site personnel to view SCADA data, find part numbers, find the descriptions and documentation of various field assets and their components, and so forth. Cross hairs may be used to dynamically reference such information within such images or scenes. They may also be used to upload photos, or other information into a scene, through using geo reference or other such related technologies, in order to reduce workload of building and compiling such information together.

In accordance with a preferred embodiment, the invention may also include real time visuals and access embedded within the pictorial sphere. By example, the pipeline system generally depicted may have an icon, pop up visual, or generally viewable portion that relates real time information imbedded into the generally static pictorial sphere view such as but not limited to a lightening status detection feature that utilizes real time information from a weather source that could provide the lightning strikes in the area of the power station, frequency and so forth. Another example may be a real time view embedded in the generally static view of power usage of a component or asset and or the current capacity load of an item in the view.

Furthermore, an icon or feature may be generally accessible from the generally static view that plays a prerecorded video. By example, a user could click on an icon over an item like a valve to show detail such as but not limited to identifying a value, serial number, play a video that shows how to replace and or repair the same unit, and so forth. This may be tied to other accessible features for specific viewing like training information and videos, engineering information and so forth. The scene and or pictorial sphere may also have a search feature that allows utilizing a search engine to find specific items. By example, when a user is viewing the power station pictorial sphere, he may type in "valve" in a search feature that would then indicate in the view all "valves" and or references to "valves" in any of the embedding information.

It is contemplated that the invention will utilize a computer database accessible through a web-based program or network. The system may have registered members or subscribers who may opt in or pay to be included in the system and who may have access to other information from other members, subscribers, patients, and so forth. It is still contemplated, that a preferred construction will be a web-based application with issued access to members and other selected members, databases and so forth. Members may pay per use, time frame orientation, or number of uses or access. It is further contemplated that member to member operations may include referral fees, awards, bonuses, benefits and the like. In another preferred embodiment, the invention may be carried out as an independent operating system, non-independent operating system, or with features of both.

It is also contemplated that a user may pay for and or receive upgrading that may enable an increased number of individuals to work under a membership, gain access for administrative staff and support-team members, and may remove advertising on pages viewed by upgraded users.

It is also contemplated that a method or system may be utilized to create a means or community through the interne that processes, registers, transfers, and discusses the aforementioned. Members of such may need to complete a login registration and personal validation questionnaire and may need a service provider background check before allowing access. It is understood that numerous ways may be utilized to do the aforementioned as known.

In a preferred embodiment, the invention may generally utilize a computer system. The system may include various input/output (I/O) devices (e.g., mouse, keyboard , display, Internet-enabled mobile phone, and Internet-enabled PDA) and one or more general purpose computers having a central processor unit (CPU), an I/O unit and a memory that stores data and various programs such as an operating system, and one or more authoring applications (e.g., programs for word processing, creating spread sheets, and producing graphics), one or more client applications (e.g., programs for accessing online services), and one or more browser applications (e.g., programs for retrieving and viewing electronic documents from the Internet and/or Web). The computer system may also include a communications device (e.g., a satellite receiver, a modem, or network adapter) for exchanging data with a host through a communications link (e.g., a telephone line and/or a wireless link) and/or a network.

It is also contemplated to utilize cloud technology. It is understood that cloud storage is a model of networked online storage where data is stored in virtualized pools of storage, which are generally hosted by third parties. Hosting companies operate large data centers, and people who require their data to be hosted buy or lease storage capacity from them. The data center operators, in the background, virtualize the resources according to the requirements of the customer and expose them as storage pools, which the customers can themselves use to store files or data objects. Physically, the resource may span across multiple servers. Cloud storage services may be accessed through a web service application programming interface (API), or through a Web-based user interface.

It is contemplated that the invention may be activated, accessed, utilized and so forth by the use of a computer screen related desktop icon for instantaneous retrieval. It is understood that in a preferred embodiment, the icon will be located in a lower location such as but not limited to a tool bar commonly associated at the bottom right of a computer screen. The invention may be accessed by other means and the icon use should not be considered limiting the scope of the invention. The invention may be utilized with any and all types of internet communication portals. Further, the invention should not be considered limited to existing systems and that the invention may be utilized with other types of internet communication portals.

Likewise, it is contemplated that the invention may be utilized in other means other than a personal computer screen application. It may be utilized with hand held devices, cellular phones, PDAs, and car computer systems or displays. It also includes devices that are mobile, devices that are stationary and or devices that are a combination of mobile and or stationary. It is further contemplated that the invention may be utilized with public phones that may include a visual screen or display to replace or enhance existing phone booths. Likewise, free standing kiosks, booths or other locations may be specifically established to provide a display and access to the invention and said invention may include such established physical access ports, places, kiosks, and the like.

It is still contemplated that the invention may include, utilize, be selectively accessed by specified groups or sub groups, such as a designated entity like a team, community, club and so forth. It is contemplated that the invention may include specific promotional materials that companies have produced and would pay the manufacturer or business to appear on line with the business that is listed or has an ad or website. This would include any and all types of information including local, regional, national, international and worldwide. It can be placed permanently or temporarily including websites, ads, commercials and any and all types of promotions, advertising, informational and communication data and not excluding any other form or type of knowledge.

Furthermore, the current invention may help operators meet the regulatory requirements of the U.S. DOT/PHMSA and basic safety requirements. A few examples include a more streamlined way of updating data in the field and returning it to the master spatial database for an accurate picture of the assets in the field, emergency response support, one call, and so forth. It is also understood that the invention may be utilized to support electric, water, wastewater roads and railways, and other complete infrastructure data management solution.

The invention may store and display a limited set of pipeline data most commonly available, relevant, and or important data for pipeline operators from a daily-operations and regulatory requirements stand-point. Data for the system may be stored in a format that allows any viewing portal, such as but not limited to map, tabular, and or chart, access to the data in a consistent manner. Data can be queried, selected and displayed using an ad-hoc query mechanism to isolate or filter datasets such as "Show all regulated pipe with a MAOP greater than 1500 psi".

Available data may be listed in an interface widget including a description of the data layer and any layer symbology used to depict the data in the map or chart interface. Symbology may be established for each data set as part of the site setup and will not be configurable by the end user.

Data stored in the 'Pipeline Data' may not be transactional with the exception of Markup Point layer. These data are considered static and must be refreshed from operational pipeline data stored in a GIS. Linear Data may include Pipeline Display Layer, Inspections, Risk Results, Class Location, High Consequence Areas, combinations thereof and so forth.

Pipeline Display Layer may be a dynamically segmented set of linear events designed to provide an overview of the pipeline. It is contemplated that these segments may not overlap. If the user clicks on a portion of the pipeline, operational characteristics may be displayed such as Line name; Segment Begin/End stationing; Pipe segment outside diameter; Pipe segment wall thickness; Pipe segment grade; Operating Stress Level as calculated by the formula "−MAOP/(2*SMYS*Wall Thick/Outside Diameter); pipe segment longitudinal seam; and Main external coating. It is understood that many different coating types/manufacturers/products can be placed on a pipe causing overlapping segments to occur. All coating types may be merged into a single field. Coating types may be ordered by Date Installed if available and different coating values will be comma delimited, such as by example "FBE, 1.4 in Concrete Weightcoat".

Operational characteristics may also include MAOP (gas); MOP (liquid) Company classification of pipeline (mainline, trunkline, storage, interconnect, etc.); DOT classification of pipeline (transmission, gathering, distribution); Product carried; Regulated (Yes/No); Primary Owner; and Primary Operator.

Inspections may include one or more inspection ranges along the pipeline. These segments can overlap each other and represent a particular type of inspection (ILI, ECDA, SSCDA, ICDA, CIS, Visual Survey, Aerial Survey, etc.). Users can 'click' on any part of a pipeline and see the history of inspections performed at that particular point. Main attributes may include Line Name; Inspection Begin/End stationing; Inspection Date; Inspection Type; and Number of Anomalies, Defects, Encroachments found as a result of inspection. Anomalies, Defects, and Encroachments are activities or events that fall out of the normal operating conditions for the pipeline and could include leaks, new road construction, areas of significant metal loss. The current invention contemplates presenting a summary of these events as they were discovered by an inspection.

Risk Results may include one or more risk segments along the pipeline. These non-overlapping segments may completely cover the pipeline. The segments may contain risk scores expressed as numeric values showing the probability and likelihood of threats of concern, and the consequence of environmental, Public Safety, Business Impact as a result of a failure. Overall risk scores for each segment such as probability of a failure and consequence of failure may be stored. Each segment may include Line Name; Segment Begin/End stationing; Probability of failure for each threat of concern; Total probability of failure such as all values from above rolled into one number for each segment; Consequence of failure for each consequence type; all consequence value from above rolled into one number for each segment or Total Consequence; and Total Risk.

Class Location may include linear features on the pipeline shown on the map or as a single row entry in a chart/tabular view for a gas pipelines. Each segment may represent the Class Location of the Line (1, 2, 3, or 4). DOT Class features completely cover the pipeline (no-gap) and may not self-overlap. These features may include the attributes of Line Name; DOT Classification; and Reason for DOT Classification (Structure Count, Cluster, Identified Site- for gas pipelines).

High Consequence Areas may include linear features on the pipeline shown on the map or as a single row entry in a chart or tabular view. Each segment may represent an area of high consequence such as environmental, financial, loss-of-life, and so forth and should a failure of the pipeline occur at that point. High consequence features are not necessarily continuous along the pipeline and may have gaps and may not self-overlap. These features may include the attributes: Line Name; HCA Classification; Reason for HCA Classification; For Gas Method 1 where Class 3 and 4 areas along with identified sites, or Method 2 where 20 or more structures within the PIR and identified sites; For Liquid, highly populated area, other populated area, navigable waterways, ecological areas, drinking water areas, and so forth.

The invention may also include Point Data. It is contemplated Point Data may generally include, Markup Layer, Control Points, Fittings and Markers, Site Point, and Conditions. The Markup layer may include a Point feature indicating the location of a comment or note as entered by a non-GIS person such as a field worker, inspector or engineer on a map or as a single row entry in a chart or tabular view. This data attribute may include Line Name; Note Type such as Missing Feature, Incorrect Feature, Pipeline Condition, Notes in general; Feature Type such as list of other point and linear feature class, table names; Priority such as High, Low, None; Status such as Pending Review, Reviewed, Reviewed with Comment; Privacy such as System, User and may indicate if the note is private to the user or submitted to the system; Buffer such as a numeric that may allow the user to create a circular buffer in current map units by feet, meters, miles, kilometers, and so forth around the point feature; Note field for user to comment about the feature and or Free-form text field; and Photo that may allow a user to geoTag a photo in proximity, click on a photo, create a link to the photo name, upload the photo, record the geotag position as a new layer and so forth.

Control Points may include Point features on the centerline shown on the map as points-of-inflection, change in route direction, with fixed stationed positions. This may be shown as a single point feature on the map or as a single row in a chart or tabular view. The attributes may include Line Name, Station Value, and so forth.

Fittings and Markers may include a Point layer containing multiple asset and condition type features represented by points on the map or single entries with a chart or tabular view. Each point may be located on the pipeline and may include the Line Name; Station position; Type such as Tee, Tap, Valve, Bend, Reducer, Anode, Test Station, Marker; Fitting Identifier, Name, Number; and Description.

Site Point may include a Point layer storing the point location of facility installations such as compressor stations, valve/meter stations, custody transfer points, and offshore platforms represented by points on the map or single row entries in a chart or tabular view. It may include the Site Name; Site Type; Inspection History that may be similar to the inspection range linear features for a pipeline, the inspection history for a site may be available as a tabular view; Anomalies, Incidents, Defects found per inspection; Sites could include test stations, above ground site inspections and so forth; and Both Inspection History and Anomalies Listing involve tabular data that is related to the site in a similar manner as the Inspection Range feature such that one feature has one or more inspections and could potentially involve more than one anomaly discovered as a result of the inspection.

Conditions may include a Point layer storing the point locations of critical incidents for gas systems, accidents for liquid systems, anomalies, defects, leaks, encroachments (or other points of operational/conditional significance) on or along the pipeline system represented by points on the map or single row entries in a chart or tabular view. This may include the Line Name; Station position; Severity (Critical, High, Low, None); Description; Incident Date such as the date the feature was discovered via inspection, reported and or repaired; Repair Type such as pipe change out, coating repair, replaced fitting, repair device and so forth; Remediation Status; and Remediation Method.

Still further, the invention contemplates Remediation Date Polygon and or Area Data. This may include the Site Boundary where a polygonal area shown in the map or as single record in chart or tabular view representing the outline, boundary and or boundaries of a facility location such as a compressor station, meter/valve station, platform, tie-in and so forth. This could also display the boundary of storage areas or temporary work easements. Attributes may include System Name; Site Name; Site Type; and Description.

Political and Administrative Boundaries may include polygonal areas for smaller political or administrative boundaries shown as a polygon area on the map or as a single row in a tabular or chart view. Attributes may include Area Name; Type such as lease blocks, township/section/range, school districts, city boundaries, federal lands that may require permit to enter/work, pipeline operating areas; and Description.

ROW/Property Parcel may include polygonal areas shown on the map or as a record in a table or chart view showing property boundaries. Attributes may include Property Parcel ID; Owner Name; Owner Contact Information such as address, phone etc.; and Description for access permissions.

Use Cases may be where a user opens the interface and views the map zooming to one or more lines as needed in an ad-hoc fashion, turning map layers on and off as needed; where a user displays all or some pipeline point, line, polygon data using the layer/legend menu; and where a user wants to show a set of data from one of the layers using a query to filter out the other data like show all regulated pipelines; show all incidents that occurred in my pipeline system last year; and show all pipe with outside diameter greater than 16" passing through a city.

The current invention may also include Hierarchy, Data Filtering and Searchability Functions. Hierarchy Design contemplates that pipes are organized into hierarchies and are often grouped together according to operational parameters. The map or report interface may be driven by a combination of a tree view and or list view of hierarchy elements. These tools will allow the user to drill down to a specific set of features and/or select those features to restrict the current dataset/display that they are viewing. Hierarchy usually involves Pipeline System, Line, and Sub-lines. Organizational/operational hierarchy can involve criteria such as DOT Classification of Transmission, Gathering, and Distribution; Regulated and non-Regulated, Onshore/Offshore, in PIMS/not in PIMS, by Product, by Owner, by Operator. These classifications are usually attributes of the main pipeline. Once a user uses the tree view to drill down to a specific set of lines, those lines can be selected and displayed in a column indicating which lines are selected and which functionality/views/portals can be used against those lines. The user can group and query lines to restrict the lines they are currently interested in and want to view. These lines could be highlighted in the map display but the display could still show the remaining centerlines and or as muted or transparent lines for reference purposes. The hierarchy can be displayed as a list with a group heading with lines under the group in a list or a tree view with a group heading, lines, and then features per line. The user can select or check one or more lines or groups of lines in order to constrain the map display and query selection set to those lines only. Each line can be hyperlinked so that if the user clicks on the line, the map display and any other displays are refreshed to show the 'active' line only. For example, the map display zooms to the extent of the line, the listing of 'inspections' is updated to only show the current list of inspections for the clicked or selected line.

Use Cases may include: 1) Show all valves and high consequence areas for Pipeline 1426 from station 5+00 to 100+00; 2) User chooses a hierarchy filter of regulated lines, then drills down to a list of lines and chooses three lines. These lines are displayed in the side-bar menu and are used to filter all subsequent queries; 3) User chooses to view all lines in system but only those lines with the top 50 highest risk segment scores. Only lines meeting those criteria are shown in the left-hand column, on the map and any report views; 4) User chooses to filter the hierarchy by operational area. The hierarchy shows the pipelines in the area, the user highlights or checks a particular pipeline and the map display; and 5) The user highlights a particular line and the map zooms to the line. The user opts to display only anodes in the fitting layer and the list for the particular line now lists the anodes in the hierarchy treeview and in a listing panel for the line. The map display zooms to the extent of the pipeline and shows the anodes on the map. As the user clicks each anode, the map display zooms into the anode (to a fixed scale—user controlled). The user can then traverse down the line looking at each anode and the immediate vicinity around that feature.

Identification of features may include a maps interface that may allow the user to perform a 'what is here?' or 'Identify' function. The identify function searches the immediate map vicinity for features and the interne for other features in the immediate vicinity of the point that was clicked. The identify function may be executed by a right click of the map display and when the user chooses an option in the resulting exposure of a context menu. The IIRC may return a standard left-side listing of items found in a normal GOOGLE search; a listing of features within the 'Pipeline Data' within proximity of the mouse click such that the listing may include visible layers of pipeline data and a count of the features in proximity of the mouse click for each of those layers; any saved hyperlinks or bookmarks with a spatial context; the user can click the GOOGLE search item or the layer or a specific feature and the 'report'/search listing view will appear based on the selected or clicked item; and the current/standard hierarchy filters may be applied to the search. It is recognized that clicking in a map in a web environment is not precise. A purpose of this tool is to return a 'bucket' of data describing the spatial context of the spot clicked on the map. This bucket may be a gestalt of information returned by GOOGLE and from the current set of 'Pipeline Data' for the current area of the click. Another purpose of this tool is to focus specifically on returning attributes about features in the current map display within the listing of Pipeline Data and for the currently specified hierarchy filter.

The invention contemplates Bookmarks. These may allow the user to save the results of a hierarchy filter, map or report display or search parameters as a bookmark or hyperlink. This may also allow the user to save these search/filter specifications in a similar manner as the GOOGLE bookmark for later visualization and retrieval.

It is therefore contemplated that:

1. User opens IIRC and displays map. The Pipeline display layer is shown automatically for all pipelines as a default. The user chooses three lines using the hierarchy browser. The map display automatically updates only showing the three lines. The user double clicks one of the lines in the hierarchy browser and map zooms to the extent of the line. The map will zoom to the extent of any lines selected by zooming using the higher level object. The user chooses to turn on additional layers from the layer control and these features only show on the map for the selected pipelines. The user is so pleased with this view he saves a bookmark.

2. User opens IIRC and map is displayed. Pipeline display layer is shown automatically for all pipelines. Extent of map display contains all pipelines. The user chooses a single line in the hierarchy browser, double clicks that pipeline and the map display zooms to the extent of the selected pipeline. The user sets the basemap layer to satellite view. The user clicks the measure distance tool and begins digitizing lines from the centerline to structures shown on satellite basemap layer. Measure distances are displayed on the map layer. Assume the distances are not saved.

3. User opens IIRC and map is displayed. Pipeline display layer is shown automatically for all pipelines. Extent of map display contains all pipelines. The user manually zooms into a specific area along the pipeline. The user turns on the Latitude/Longitude tool (pressing the SHIFT key) and clicks the map. The Latitude/Longitude of the clicked point is displayed to the user on the map as a tooltip. The user turns on the Latitude/Longitude tag display tool (as an option) and tags are displayed on the map window when the user right clicks the map and chooses the 'tag Lat/Long' option from the context menu.

4. User opens IIRC and map is displayed. Pipeline display layer is shown automatically for all pipelines. Extent of map display contains all pipelines. The user opts to display the Overview Map, which is displayed in the lower right corner of the map. The user manually zooms into a specific area along the pipeline. The map and the overview map respond by refreshing. The user can drag the map extent box in the overmap to reset the extent of the main map window.

5. Two scenarios may be:

a. User opens IIRC and map is displayed. Pipeline display layer is shown automatically for all pipelines. Extent of map display contains all pipelines. The user manually zooms into a specific area along the pipeline. The user opens the layer control and turns on various "Pipeline Data" layers. The user then right clicks the map close to the pipeline and chooses 'What is here' from the context menu. The tool searches the "Pipeline Data" layers and the Internet (GOOGLE search) and lists the results of features found within 1 mile of the clicked point. The results will be returned on the left hand side in two groups—"Pipeline Data" results and "Internet" results. The user browses the results expanding then in the left-hand list, highlighting them as points on the map, or causing fly-out label/captions to appear as the features are clicked in the left-hand list.

b. User opens IIRC and map is displayed. Pipeline display layer is shown automatically for all pipelines. Extent of map display contains all pipelines. The user manually zooms into a specific area along the pipeline. The user enters a search term in the address box above the map. A search is executed against "Pipeline Data" layers and the Internet (GOOGLE search) and lists the results of features found within the extent of the map. The results will be returned on the left hand side in two groups—"Pipeline Data" results and "Internet" results. The user browses the results expanding then in the left-hand list, highlighting them as points on the map, or causing fly-out label/captions to appear as the features are clicked in the left-hand list.

6. User opens IIRC and map is displayed. Pipeline display layer is shown automatically for all pipelines. Extent of map display contains all pipelines. The user manually zooms into a specific area along the pipeline. The user opens the layer control and turns on various "Pipeline Data" layers. The user then right clicks the map close to the pipeline and chooses 'Identify' from the context menu. The user is presented with a listing of layers for "Pipeline Data" within the vicinity of the map click (X meters/feet). The user chooses one or more of the layers (or "All Visible Layers" option) and the listing of features is presented in the left hand list grouped by layer/feature type with attributes. The user has the option to toggle to 'Report/Tabular' view to display the grouped features listed by type in tabular view.

7. User opens IIRC and map is displayed. Pipeline display layer is shown automatically for all pipelines. Extent of map display contains all pipelines. The user chooses a pipeline from the hierarchy and zooms the extent of the pipeline. The user opens the layer control and turns on various "Pipeline Data" layers. The user enters a search term in the search address bar. The results of the search appear on the map and in the left list. The user clicks the hyperlink button and sends it (including map extent, layer, search terms, hierarchy filter) via email to a colleague. The user clicks the hyperlink button and saves it to their personal repository with a descriptive annotation. The user clicks the hyperlink button and chooses the 'Browse' option, then browses a list of system and personal saved hyperlinks (by reading the listed annotations for each hyperlink). The user then chooses a hyperlink. The map extent, layers, search items and hierarchy filter are set according to the parameters of the saved hyperlink.

It is contemplated to provide a Mark Up Interface wherein the user will be able to add point features to a layer within the map interface. The point feature will describe a location (XY) and descriptive notes. This allows the user to provide feedback about current data or to note new conditions on or along a pipeline system. The feature will become immediately viewable in the map display and in a report/tabular listing. These points are called IIRC Markups.

The IIRC Mark Up may include Right click the map and choose 'Add Note'. A point will appear on the map at the point clicked and a pop-up form/window will appear allowing the user to enter specific parameters and add ad-hoc descriptions/notes; Right click the map and choose 'Edit Note' if the map click is in proximity to an existing IIRC Markup; The user can show a current point as a label on the map (in addition to the point symbol); The user can save the point (within the current 'session'); The user can buffer the point and include the polygon for the point (specify distance and distance units); IIRC markups can be shown as a layer; IIRC markup labels/annotation can be shown as a layer; Auto-populate user name and date-entered when a point is created, auto-populate last modified date when a point is updated/edited; Allow users to edit their own points or add additional notes to an existing point (but not change original attributes) that is 'owned' by a different user; Allow the user to relate the point to a specific feature (if the point clicked on the map is in proximity to features listed in the 'Pipeline Data' then allow the user to choose a layer and then a feature to relate the IIRC markup to); Allow the user to enter a 'Note Type' (e.g.. Incorrect Data, New Data, General Note, Pipeline Condition, etc.); Allow the user to enter descriptive ad-hoc notes about the point feature (or append additional notes to an existing feature—automatically capture user ID and date and append them to supplemental notes); The user can cancel or submit new point, updated point; Cancel clears the map display; Submit save the point to the IIRC markup layer and displays point on the map; Allow user to send/share information about the added point (via email by example); The user can view/identify attributes using the standard tools (listed in Identification of Features—above);

User can attach one or more documents to the markup point; Attached documents will be uploaded and saved as GOOGLE Documents in one of the following formats: Document, Spreadsheet, Presentation, PDF, Text, CSV; The interface will show a listing of attached documents. The listings will be active hyperlinks that point to the saved/uploaded GOOGLE document; and the icon for the mark-up point feature will change to indicate that a document has been attached.

It is therefore contemplated:

1. User opens IIRC and map is displayed. Pipeline display layer is shown automatically for all pipelines. Extent of map display contains all pipelines. The user chooses a pipeline from the hierarchy and zooms the extent of the pipeline. The user opens the layer control and turns on various "Pipeline Data" layers including the "IIRC Markup" layer (if there are any 'personal' or 'system' points in map extent they are displayed, with different symbols, including any buffer circles around the points). The user right clicks the map and chooses 'Add Note' from the context menu. A point appears on the map at the point clicked and the user enters information in the pop-up window (user ID, created date/time, last modified date/time are automatically set). User sets the point type from a dropdown, enters a descriptive note, chooses to save as a 'personal' not system point. User specifies a buffer distance and map units (the map displays a semi-transparent circle buffered from the clicked point). The user enters note/descriptive information and saves the data. The point and buffer remain displayed in the map.

2. User opens IIRC and map is displayed. Pipeline display layer is shown automatically for all pipelines. Extent of map display contains all pipelines. The user chooses a pipeline from the hierarchy and zooms the extent of the pipeline. The user opens the layer control and turns on various "Pipeline Data" layers including the "IIRC Markup" layer (if there are any 'personal' or 'system' points in map extent they are displayed, with different symbols, including any buffer circles around the points). The user right clicks the map and chooses 'Add Note' from the context menu. A point appears on the map at the point clicked and the user enters information in the pop-up window (user ID, their GOOGLE login ID/email address as a hyperlink, created date/time, last modified date/time are automatically set).

a. The pop-up form displays an option to 'Relate to Pipeline Feature'. If the user chooses the option, a pop-up (or form extension/expansion) appears listing the layers of any "Pipeline Data" features within 100 (feet/meters) of the map click. The user chooses a layer, then chooses a list of displayed features (clicking a feature will flash or highlight it in the map). The system includes the layer and feature reference in the pop-up window information.

b. User sets the point type from a dropdown, enters a descriptive note, chooses to save as a 'personal' not system point. User specifies a buffer distance and map units (the map displays a semi-transparent circle buffered from the clicked point). The user enters note/descriptive information and saves the data. The point and buffer remain displayed.

3. User opens IIRC and map is displayed. Pipeline display layer is shown automatically for all pipelines. Extent of map display contains all pipelines. The user chooses a pipeline from the hierarchy and zooms the extent of the pipeline. The user opens the layer control and turns on various "Pipeline Data" layers including the "IIRC Markup" layer (if there are any 'personal' or 'system' points in map extent they are displayed, with different symbols, including any buffer circles around the points). The user right clicks the map on an existing "IIRC Markup Point" and chooses 'Edit Note' from the context menu.

a. If the user clicks a point created by another user the standard IIRC point popup appears listing all information about the point. The user can add an additional note to the point but cannot modify the existing point information. The user can choose to submit the new information or cancel. If the user chooses submit the point is saved with the additional annotation and email is sent to the original user.

b. If the user clicks a point created by themselves they are allowed to update the information including relating to a "Pipeline Data" feature, adding a buffer, modifying notes/data type etc. When finished the user has the option to save, cancel or save/send to another user the information as a standard bookmark (see Bookmarks section above).

The current invention also contemplates Reporting where Users can view data in the map view. Users can view data in the report or tabular view. The report tabular view is a HTML display of row/column data for one or more layers of data/features. A layer is analogous to a feature type or map layer (aka—valves or pipes or risk segments). The report view allows the user to display, browse, sort and export data in a tabular view for further analysis and manipulation. It is assumed that data will be returned to the user 'as-is' without the options for scripting and geoprocessing to format or further refine the data. The Tabular reports/views of data will be returned in a standard report format and can be exported as a 'GOOGLE DOC Spreadsheet'.

High level functionality for reporting/tabular views may allow users to query and filter data using the hierarchy display, identify tool and the search functionality (as described in previous sections); allow users to view a report in HTML format or immediately export to a GOOGLE Spreadsheet document; Allow user to select or filter records in a report using a simple query tool—choose attribute, choose operator, choose filter criteria similar to the standard 'select by attributes' window used in ArcMap; and Provide canned or pre-formatted reports including: Incident/Accident (incident is for gas, accident is for liquid) report; Anomaly Register Report (system, one or more lines, section of a line); Pipeline Register (system, one or more lines) (Line Meta Data Report, lists lines and or sites. This is a Pipeline Summary Report.); Asset Register (Linear features display layer table—pipe, coating, MAOP, pressure test—OD/WT/Coating type etc.) This is a high-level feature/attribute listing for a selected pipeline/range/list of features. This becomes in essence a tabular alignment sheet type report; Inspection History (one or more lines, section of a line); Risk Rollup Segment Segments (system, one or more lines); Risk Results Report (Heat Map—Threat Consequence Report); Allow the user to further refine the hierarchy filter by choosing visible layers, all layers, etc. or a given section of the line (begin/end stationing); Once data is exported to 'GOOGLE Spreadsheet Document' the user can utilize the standard print/export formats available through that interface (save as PDF, CSV, XLS, etc.).

Furthermore, it may allow the user to save a set of data as a KML file; and Allow the user to print the selected set of records from the 'GOOGLE Spreadsheet Document' interface (this is standard functionality) or as a standard 'map' view returned in tabular format is the result of a single query against a single data source.

It is therefore contemplated:

1. User opens IIRC and map is displayed. Pipeline display layer is shown automatically for all pipelines. Extent of map display contains all pipelines. The user chooses a pipeline from the hierarchy and zooms the extent of the pipeline. The user opens the layer control and turns on various "Pipeline Data" layers. The user toggles over to report view and is presented with a set of hyperlinks in the main portion of the screen listing the active layers of "Pipeline Data". Expanding a layer opens a tabular display of the data for the layer showing attributes of all features for that layer, for the pipeline specified in the hierarchy filter. The report is initially generated for the extent of the pipeline within the few or the selected pipelines listed in the hierarchy control (the default). User applies an additional filter using a SQL window. The expanded layer table is updated. The user clicks the 'export' button and is prompted to enter a file name. The user enters the name and the table is saved as a 'GOOGLE Spreadsheet' document. Another tab is opened in the browser with the file opened.

2. User opens IIRC and map is displayed. Pipeline display layer is shown automatically for all pipelines. Extent of map display contains all pipelines. The user toggles to the report view. The standard groups appear for each visible layer in the map. The user chooses the 'Standard Report' button and a listing of reports (including . . . Incident report Anomaly Register, Pipeline Register, Asset Register, Inspection History, PIMS report, FLRA Segments, Master MAOP, Risk Results) are listed along the right hand side of the report interface. The user clicks a report. The report is generated and displayed in the main report section of the interface. The user opts to export the report and features in the report as a KML file. The user enters a path/file name and the file is saved in the appropriate location. The report is initially generated for the extents of the pipeline within the few or the selected pipelines listed in the hierarchy control (the default).

It is also contemplated that the IIRC will be built on the GOOGLE APP ENGINE (GAE). This allows an end user to build web based applications. The applications, once built are hosted by GOOGLE. This allows for simple administration and scalability. Hosting the web application offsite also alleviates requirements for an administrator to manage IT infrastructure and hardware requirements.

Data Storage may be of numerous known methods and applications such as GOOGLE EARTH BUILDER; Data store through GOOGLE APP ENGINE; MySQL through GOOGLE Cloud SQL; An open source database engine that could store relational data in this and use it as the primary database; or hosting a SQL relational database on another cloud service and expose it through a web service.

It is also contemplated to provide Authentication and or Security with a GOOGLE App Engine, GOOGLE Account, GOOGLE App Accounts; and OpenID with a decentralized authentication protocol that makes it easy for people to sign up and access web accounts. It is contemplated a list of users and their permissions will have to be stored and accessed, to determine if the currently logged in user is able to use certain functionality or view certain areas of the web site.

The invention may also generally include Data Processing where Client data is stored within operational GIS system. Scripts and/or processing tasks are required to process/format client data for use in IIRC. These could take a number of forms, such as Python scripts, Batch files, Web services, etc.

Changes may be made in the combinations, operations, and arrangements of the various parts and elements described herein without departing from the spirit and scope of the invention. Furthermore, names, titles, headings and general division of the aforementioned are provided for convenience and should, therefore, not be considered limiting.

We claim:

1. An interactive digital visualization of a pipeline system comprising:

at least one interactive digital pictorial visualizing said pipeline system;

a central computer data base to store said at least one digital pictorial visualizing wherein the central computer data base is accessible through the Internet and further wherein said at least one interactive digital pictorial visualizing is embedded with specified information about said pipeline system;

a local computer connected to access said central computer data base through the Internet;

a control interface connected to said local computer to enable a user to control said local computer such that the local computer obtains data from the central computer data base through the Internet in response to a digital signals stored therein and displays said at least one interactive digital pictorial visualizing said pipeline system for accessing said embedded specified information about said pipeline system;

wherein said embedded specified information about said pipeline system comprises real time status information about said pipeline system including a power usage of a component of said pipeline system;

wherein said real time status information about said pipeline system includes applicable government regulations information;

wherein said applicable government regulations information includes safety rules;

wherein said embedded specified information about said pipeline system comprises a viewable on desire close up of a pipeline;

wherein said embedded specified information about said pipeline system includes power usage of a component of said pipeline system;

wherein said pipeline system has a control room in communication with said real time status information and adapted to control said pipeline system with said real time status information;

wherein said embedded specified information about said pipeline system comprises real time status information about valves on said pipeline system including how to replace said valves; and replacement valves that replaced said valves.

* * * * *